(12) United States Patent
Xie et al.

(10) Patent No.: US 10,890,795 B2
(45) Date of Patent: Jan. 12, 2021

(54) TOUCH DISPLAY DEVICE

(71) Applicant: Shanghai Tianma Micro-Electronics Co., Ltd., Shanghai (CN)

(72) Inventors: Ming Xie, Shanghai (CN); Xiangjian Kong, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 92 days.

(21) Appl. No.: 15/847,091

(22) Filed: Dec. 19, 2017

(65) Prior Publication Data
US 2019/0018271 A1    Jan. 17, 2019

(30) Foreign Application Priority Data
Jul. 12, 2017   (CN) .......................... 2017 1 0565250

(51) Int. Cl.
| G02F 1/1333 | (2006.01) |
| G02F 1/1335 | (2006.01) |
| G06F 3/041 | (2006.01) |
| G06F 3/044 | (2006.01) |
| G02F 1/1343 | (2006.01) |

(52) U.S. Cl.
CPC ...... *G02F 1/13338* (2013.01); *G02F 1/13439* (2013.01); *G02F 1/133553* (2013.01); *G06F 3/044* (2013.01); *G06F 3/0412* (2013.01); *G02F 2001/133565* (2013.01); *G02F 2001/133567* (2013.01); *G02F 2201/121* (2013.01); *G02F 2201/34* (2013.01); *G02F 2203/02* (2013.01); *G06F 3/0443* (2019.05); *G06F 3/04146* (2019.05)

(58) Field of Classification Search
CPC ........... G02F 1/13338; G02F 1/133553; G02F 2201/34; G02F 2203/02; G06F 3/0412; G06F 3/044; G06F 3/04146; G06F 3/0443; G06F 2203/04107; G06F 2203/04112
See application file for complete search history.

(56) References Cited

U.S. PATENT DOCUMENTS

2017/0176791 A1* 6/2017 Kubota ............. G02F 1/133345
2018/0004037 A1* 1/2018 Park .................. G02F 1/133553

* cited by examiner

*Primary Examiner* — Angela K Davison
(74) *Attorney, Agent, or Firm* — Tarolli, Sundheim, Covell & Tummino LLP

(57) ABSTRACT

The present disclosure provides a touch display device, including an upper substrate, a lower substrate, and a liquid crystal layer placed between the upper and lower substrates. The upper substrate includes a touch detection structure, and a plurality of pixel units arranged in a matrix. Each pixel unit includes a switch element and a pixel electrode. The lower substrate includes a common electrode and a reflection layer. The reflection layer is used for reflecting external light, and the external light refers to light from outside and sequentially emitting to the upper substrate and the liquid crystal layer, and then being incident to the reflection layer. In the touch display device, no whole or large area display electrode such as the common electrode is placed between the touch detection structure and the users. Thus, external touch signals will not be shielded, and the touch function can be better realized.

16 Claims, 5 Drawing Sheets

TOUCH DISPLAY DEVICE

CROSS-REFERENCE TO RELATED APPLICATIONS

The present application claims the benefit of priority to Chinese Patent Application No. 201710565250.3, filed on Jul. 12, 2017, the content of which is incorporated herein by reference in its entirety.

TECHNICAL FIELD

The present disclosure relates to the field of display technologies and, more particularly, to a touch display device.

BACKGROUND

With the development of science and technology, a display device with a display panel is used more and more popularly, and people have more and more requirements on touch performance of the display panel. A technology development trend is to use a solution by integrating a touch module into a display panel (in-cell) instead of an add-on touch solution.

At present, a touch detection structure of an in-cell touch display device is generally used in an in-plane switching liquid crystal display (IPS-LCD) element, in which a touch electrode is integrated in an array substrate. If the in-cell touch display solution of the original IPS-LCD is applied to a currently mainstream reflective liquid crystal display element, such as electrically controlled birefringent liquid crystal display (ECB-LCD) device, twist nematic liquid crystal display (TN-LCD) device, and vertically aligned liquid crystal display (VA-LCD) device, an external touch signal may be shielded by a display electrode layer (such as common electrode) on a side of an upper glass substrate, which may disable the touch signal and thus causing failure of the touch function.

SUMMARY

One purpose of the present disclosure is to provide a touch display device, to solve the problem that external touch signal is shielded by a display electrode on the upper substrate in the related art and thus the touch function cannot be realized.

The present disclosure provides a touch display device, including an upper substrate, comprising a touch detection structure and a plurality of pixel units arranged in a matrix, each of the plurality of pixel units comprising a switch element and a pixel electrode; a lower substrate, comprising a common electrode and a reflection layer, the reflection layer being used for reflecting external light; and a liquid crystal layer, placed between the upper substrate and the lower substrate; wherein the external light is from an exterior of the touch display device and sequentially emitting to the upper substrate and the liquid crystal layer and then being incident to the reflection layer.

Compared to the related art, solutions of the present disclosure have advantages as follows: the touch display device includes an upper substrate, a lower substrate, and a liquid crystal layer placed between the upper substrate and the lower substrate. The upper substrate includes a touch detection structure and a plurality of pixel units arranged in a matrix. Each of the plurality of pixel units includes a switch element and a pixel electrode. The lower substrate includes a common electrode and a reflection layer. The reflection layer is used for reflecting external light, and the external light refers to light from outside of the touch display device and sequentially emitting to the upper substrate and the liquid crystal layer, and then being incident to the reflection layer. In the touch display device provided by the present embodiment, the upper substrate with the touch detection structure is placed on a side of the liquid crystal layer facing the users (viewers or touch operators), and the common electrode and the reflection layer are placed on a side of the liquid crystal layer away from the users. That is to say, no whole or large area display electrode such as the common electrode is placed between the touch detection structure and the users. Thus, external touch signals provided by the users will not be shielded by the whole or large area display electrode such as the common electrode, and the touch function can be better realized.

BRIEF DESCRIPTION OF DRAWINGS

By referring to the following drawings, the detailed description made to non-limiting embodiments makes other characteristics, objects, and advantages of the present disclosure become more apparent.

DESCRIPTION OF EMBODIMENTS

The present disclosure is described in further detail with reference to the accompanying drawings and embodiments. It is understood that, specific embodiments described herein are used only for explaining the present disclosure, rather than limitations of the present disclosure. It should also be noted that, for ease of description, only parts related to the present disclosure rather than a whole structure are illustrated in the accompanying drawings. It may be not discussed in detail for technology, method, and apparatus known to those of ordinary skill in the art, but in appropriate cases, the technology, method, and apparatus should be considered as a part of the specification.

In all examples shown and discussed herein, any specific value should be construed as merely exemplary, but not as limitation. Therefore, other examples of exemplary embodiments can have different values.

It should be noted that, similar numeral and letter represents similar terms in following accompanying drawings, therefore, once being defined in a certain drawing, then it is not needed to further discuss in subsequent accompanying drawings.

Figure 1:
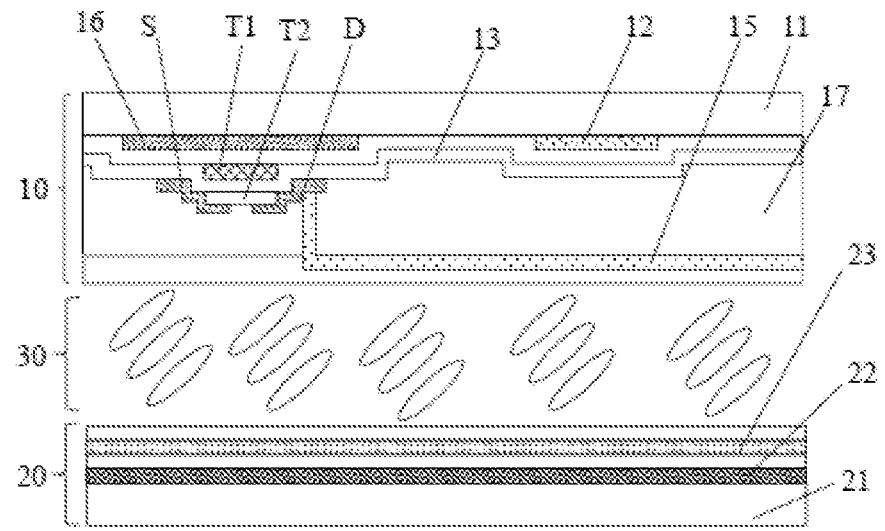
FIG. 1 illustrates a cross-sectional view of a touch display device according to an embodiment of the present disclosure.
Figure 2:
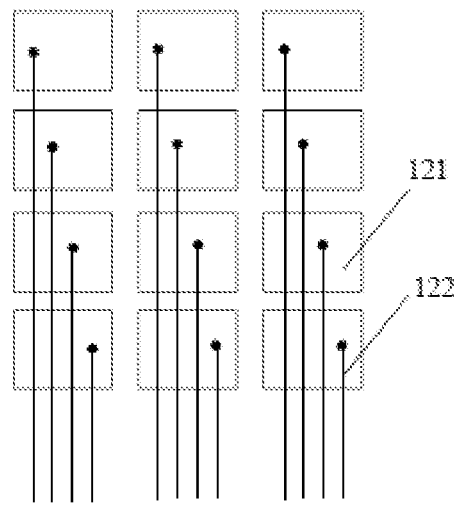
FIG. 2 illustrates a structural schematic view of a touch detection structure of the touch display device as shown in FIG. 1.

First, the present disclosure provides a touch display device. FIG. 1 illustrates a cross-sectional view of a touch display device according to an embodiment of the present disclosure, and FIG. 2 illustrates a schematic view of a touch detection structure of the touch display device as shown in FIG. 1. Referring to FIGS. 1 and 2, the touch display device is a reflective touch display device, and includes an upper substrate 10, a lower substrate 20 placed opposite to the upper substrate 10, and a liquid crystal layer 30 placed between the upper substrate 10 and the lower substrate 20. The upper substrate 10 is placed between a user (or user's eyes) and the lower substrate 20.

In the present embodiment, the upper substrate 10 is an array substrate, and the array substrate includes an upper base substrate 11 made of transparent materials such as glass, and a touch detection structure 12 placed on the upper base substrate 11. The touch detection structure 12 is placed on a side of the upper base substrate 11 facing the lower substrate 20. In an embodiment of the present disclosure, a touch type of the touch detection structure can be of self-capacitance type or mutual capacitance type, or can be pressure sensitive touch. Take the self-capacitance type as an example, the touch detection structure 12 includes a plurality of touch electrodes 121 arranged in a matrix, and each touch electrode 121 is electrically connected with a port of a touch chip for receiving a detection signal and a port of the touch chip for outputting a scan signal respectively by touch signal lines 122. When the user touches, a capacitance between the touch electrode 121 corresponding to a touch position and the ground changes, the detection signal on the touch electrode 121 corresponding to the touch position changes, and then the touch chip can determine the touch position by the detection signal received, so that a display panel performs a corresponding operation. A material of the touch electrode can be conductive metal or transparent conduction layer. A material of the transparent conduction layer can be indium tin oxide, indium zinc oxide, aluminum tin oxide, aluminum zinc oxide, indium germanium zinc oxide, other applicable oxides, or a stacked layer of at least two of the above described oxides. The touch signal line 122 can be made in a same layer with the touch electrode 121, or when the touch electrode 121 is made of transparent material such as indium tin oxide, the touch signal line 122 can be formed by a metallic wiring additionally provided, so as to decrease touch resistance and improve sensitivity of touch detection.

In the present embodiment, the upper substrate 10 further includes a plurality of data lines parallel to each other and a plurality of scan lines parallel to each other. The data lines and the scan lines intersect with each other to define a plurality of pixel units arranged in a matrix. Each pixel unit includes at least one scan line, at least one data line, at least one switch element T, and at least one pixel electrode 15. In the present embodiment, the scan line and data line can be made of metal material, however, this is not limited in the present disclosure, which can also be alloys, metal nitrides, metal oxides, metal nitrogen oxides, or a stacked layer of metallic materials and other conductive materials.

Each switch element T includes a gate electrode T1, a semiconductor channel T2 overlapped with the gate electrode T1, a gate insulation layer 13 placed between the gate electrode T1 and the semiconductor channel T2, a source electrode S, and a drain electrode D. The source electrode S and the drain electrode D are electrically connected with two sides of the semiconductor channel T2, respectively. The gate electrode T1 of the switch element T is electrically connected with the scan line, and the source electrode S of the switch element T is electrically connected with the data line. The pixel electrode 15 is electrically connected with the drain electrode D of the switch element T. In the present embodiment, the gate electrode T1 and the scan line can be selectively formed in a same layer; the touch signal line 122 and the scan line can also be formed in a same layer; the source electrode S, the drain electrode D, and the data line can be selectively formed in a same layer; and the touch signal line 122 and the data line can also be formed in a same layer. However, it is not limited in the present disclosure, in other embodiments, a layer relation between the gate electrode and the scan line and/or a layer relation between the source/drain electrode and the data line can be designed according to actual requirements.

A material of the pixel electrode 15 can be transparent conductive materials, such as indium tin oxide, indium zinc oxide, aluminum tin oxide, aluminum zinc oxide, indium germanium zinc oxide and the like.

Furthermore, in the present embodiment, the touch electrode 121 is time-division multiplexed as a storage electrode. In each pixel unit, the storage electrode and the pixel electrode 15 cooperatively form a storage capacitor to provide a storage voltage for each pixel unit. In order to improve a transmittance of the touch display device, in this case, material of the touch electrode 121 can be transparent conductive material, such as indium tin oxide, indium zinc oxide, aluminum tin oxide, aluminum zinc oxide, indium germanium zinc oxide and the like.

In other embodiments, the storage electrode and the touch detection structure can also be separately placed, that is to say, the storage electrode and the touch electrode are formed in different layers.

Furthermore, in the present embodiment, the upper substrate 10 further includes a black matrix 16. The black matrix 16 is placed on the upper base substrate 11 and located in areas of the upper substrate where the metallic wiring and the switch element T are located, in other words, projections of the metallic wiring and the switch element T on the upper substrate are located in a projection of the black matrix 16 on the upper substrate, in which the metallic wiring can be the above described scan line, data line, touch signal line, and so on. In the present disclosure, the black matrix 16 is located between the switch element T and the metallic wiring, and the upper base substrate 11, to shield light reflected and leaking out of the metallic wiring and the switch element T, and to protect the switch element T, thereby prolong usage lifetime of the switch element T.

In the present embodiment, since the upper substrate 10 is the array substrate, and the black matrix 16 is formed on the array substrate (upper substrate) but not on the lower substrate, when the upper substrate and the lower substrate are sealed to be a box, requirements of the touch display device on box precision is lowered apparently. A forming area of the black matrix 16 and a forming area of the pixel electrode 15 are not overlapped, so that an aperture ratio of the liquid crystal display panel will not be affected, and light leaking in areas outside the pixel electrode is prevented, which is good for improving display performance of the touch display device.

Furthermore, the upper substrate 10 further includes a planarization layer 17. The planarization layer 17, such as organic insulation film with light transmission, is used for making the pixel electrode 15 on the planarization layer 17 be flattened by absorbing steps formed by the metal wirings (such as scan line and data line) and the switch element T placed below the planarization layer 17. A through hole is defined in the planarization layer 17. The pixel electrode 15 is placed on a side of the planarization layer 17 away from the switch element T and the metallic wirings, and is electrically connected with a drain electrode D of an active element through the through hole. A material of the planarization layer 17 can be inorganic materials (such as silicon oxide, silicon nitride, silicon nitrogen oxide, other applicable materials, or stacked layer of at least two of above described materials), organic materials, other applicable materials, or combinations thereof.

The lower substrate 20 includes a lower base substrate 21, a reflection layer 22, and a common electrode 23. The reflection layer 22 and the common electrode 23 are placed on the lower base substrate 21. The reflection layer 22 and the common electrode 23 are spaced from each other by a spacing layer, which is not limited in the present embodiment. In the present embodiment, the common electrode 23 can be a transparent conduction electrode and placed between the reflection layer 22 and the liquid crystal layer 30. In other embodiments, the reflection layer can be placed between the liquid crystal layer and the common electrode, that is to say, the common electrode is placed between the lower base substrate and the reflection layer. The reflection layer 22 is used for reflecting external light, and the external light refers to external ambient light, which light is from the exterior of the touch display device, sequentially emitting to the upper substrate and the liquid crystal layer, and then incident to the reflection layer 22. The reflection layer 22 can be made of aluminum or silver by an evaporation method, or can be made of compounds or alloys including a composition of metal material, such as aluminum and silver.

The switch element T drives the pixel electrode 15 independently according to signals from the scan lines, and a voltage difference is formed between the pixel electrode 15 and the common electrode 23 according to signals from the data lines, to drive liquid crystal molecules in the liquid crystal layer 30 to change their state. At that stage, the external light incident from a side of the upper substrate 10 passes through the liquid crystal layer 30 to the reflection layer 22 of the lower substrate, and is reflected by the reflection layer 22 to each pixel electrode 15. Thus, a reflection light is displayed as an image after passing through the pixel electrode 15 and according to angle settings of the liquid molecules of the liquid crystal layer 30.

Furthermore, an alignment film is placed on a side of the upper substrate adjacent to the liquid crystal layer, and an alignment film is placed on a side of the lower substrate adjacent to the liquid crystal layer, for providing a primary alignment for the liquid crystal molecules of the liquid crystal layer.

The liquid crystal layer 30 can use various types, such as ECB, TN, and VA. For example, the liquid crystal layer 30 uses a normal white twisted nematic type.

In the touch display device provided by the present embodiment, for each pixel unit, under driven by the voltage difference between the pixel electrode and the common electrode, liquid crystal molecules of the liquid crystal layer change their state, such as being rotated and twisted, which is cooperated with a polarized device placed on the upper base substrate, so that each pixel unit has an off-state and an on-state according to time division. When the pixel unit is in the off-state, light reflected by the reflection layer cannot pass through the pixel unit, and at this time the pixel unit displays black color; and when pixel unit is in the on-state, light reflected by the reflection layer can pass through the pixel unit, and at this time the pixel unit displays white color. By controlling the data signals provided by the data lines electrically connected with each pixel unit, each pixel unit displays black color or white color required by different images, and then the touch display device can display black and white images using external ambient light (such as sun light) without additional backlight, thereby saving power consumption.

Furthermore, in the touch display device provided by the present embodiment, the array substrate with the touch detection structure is placed on a side of the liquid crystal layer facing the users, and the common electrode and the reflection layer are placed on a side of the liquid crystal layer away from the users. That is to say, no whole or large area display electrode, such as the common electrode, is placed between the touch detection structure and the users. Thus, external touch signals provided by the users will not be shielded by the whole or large area display electrode such as the common electrode, and the touch function can be better realized.

Figure 3:
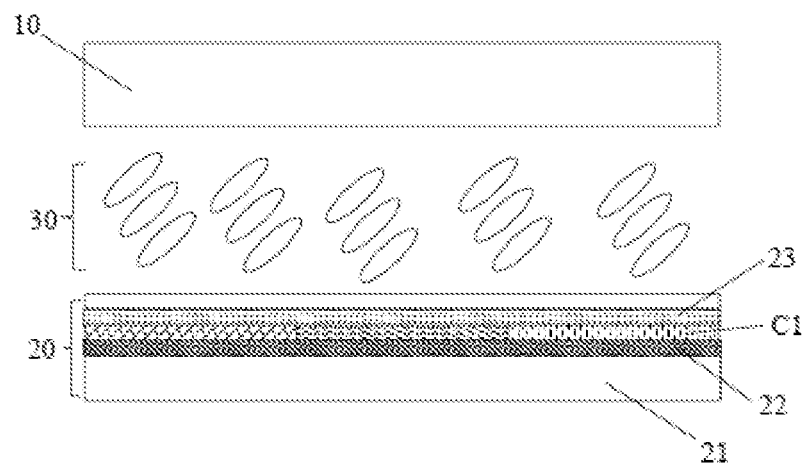
FIG. 3 illustrates a cross-sectional view of a touch display device according to another embodiment of the present disclosure.

FIG. 3 is a cross-sectional view of a touch display device in another embodiment of the present disclosure. The touch display device in the present embodiment is a reflective-type touch display device, and includes an upper substrate 10, a lower substrate 20 placed opposite to the upper substrate 10, and a liquid crystal layer 30 placed between the upper substrate 10 and the lower substrate 20. The upper substrate 10 is placed between users (or users' eyes) and the lower substrate 20.

In the present embodiment, the upper substrate 10 is an array substrate, and has a similar structure to the upper substrate in FIGS. 1 and 2. The upper substrate 10 includes a touch detection structure and a plurality of pixel units arranged in a matrix. The touch detection structure includes a touch electrode and a touch signal line. Each pixel unit includes a switch element, a pixel electrode, a data line, a scan line, and so on.

In the present embodiment, the lower substrate 20 includes a lower base substrate 21, a reflection layer 22, a color filter layer C1, and a common electrode 23. The reflection layer 22, the color filter layer C1, and the common electrode 23 are placed on the lower base substrate 21. The reflection layer 22 is used for reflecting external light, and the external light refers to external ambient light, which light is from the exterior of the touch display device, sequentially emitting to the upper substrate and the liquid crystal layer, and then incident to the reflection layer 22. The reflection layer 22 can be made of aluminum or silver by an evaporation method, or can be made of compounds or alloys including a composition of metal material, such as aluminum and silver. The color filter layer C1 is placed on a side of the reflection layer 22 facing the liquid crystal layer 30, so that light reflected by the reflection layer 22 will pass through the color filter layer C1 to the liquid crystal layer 30. The color filter layer C1 includes various color resistors, such as red color resistors, green color resistors, and blue color resistors. Each color resistor corresponds to one pixel unit on the array substrate, so that light emitted from each pixel unit displays a corresponding color. Adjacent color resistors are spaced from each other by a black matrix to prevent color mixing. Or, the black matrix placed on the array substrate covers a joining area between the adjacent color resistors to prevent color mixing.

The liquid crystal layer 30 can use various types, such as ECB, TN, and VA. For example, the liquid crystal layer 30 uses a normal white twisted nematic type.

In the touch display device provided by the present embodiment, for each pixel unit, under driven by the voltage difference between the pixel electrode and the common electrode, liquid crystal molecules of the liquid crystal layer change their state, such as being rotated and twisted, which is cooperated with a polarized device placed on the upper base substrate, so that each pixel unit has an off-state and an on-state according to time division. When the pixel unit is in the off-state, light reflected by the reflection layer cannot pass through the pixel unit, and at this time the pixel unit displays black color; and when pixel unit is in the on-state, light reflected by the reflection layer can pass through the pixel unit, and at this time the pixel unit displays color of the color resistor corresponding to the pixel unit. By controlling the data signals provided by the data lines electrically connected with each pixel unit, each pixel unit displays colors required by different images, and then the touch display device can display colorful images using external ambient light (such as sun light) without additional backlight, thereby saving power consumption.

Furthermore, in the touch display device provided by the present embodiment, the array substrate with the touch detection structure is placed on a side of the liquid crystal layer facing the users, and the common electrode and the reflection layer are placed on a side of the liquid crystal layer away from the users. That is to say, no whole or large area display electrode, such as the common electrode, is placed between the touch detection structure and the users. Thus, external touch signals provided by the users will not be shielded by the whole or large area display electrode such as the common electrode, and the touch function can be better realized.

Figure 4:
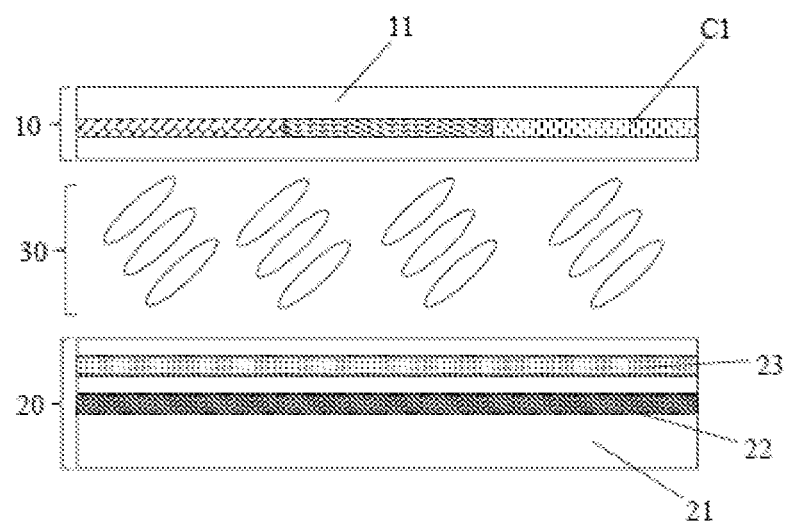
FIG. 4 illustrates a cross-sectional view of a touch display device according to still another embodiment of the present disclosure.

FIG. 4 is a cross-sectional view of a touch display device in another embodiment of the present disclosure. The touch display device in the present embodiment is a reflective-type touch display device, and includes an upper substrate 10, a lower substrate 20 placed opposite to the lower substrate 10, and a liquid crystal layer 30 placed between the upper substrate 10 and the lower substrate 20. The upper substrate 10 is placed between users (or users' eyes) and the lower substrate 20.

In the present embodiment, the upper substrate 10 is an array substrate, and has a similar structure to the upper substrate in FIGS. 1 and 2. The upper substrate 10 includes a touch detection structure and a plurality of pixel units arranged in a matrix. The touch detection structure includes a touch electrode and a touch signal line. Each pixel unit includes a switch element, a pixel electrode, a data line, a scan line, and so on. The lower substrate 20 includes a lower base substrate 21, a reflection layer 22, and a common electrode 23. The reflection layer 22 and the common electrode 23 are placed on the lower base substrate 21. The reflection layer 22 is used for reflecting external light, and the external light refers to external ambient light, which is light from the exterior of the touch display device, emitting to the upper substrate and then being incident to the reflection layer 22. The reflection layer 22 can be made of aluminum or silver by an evaporation method, or can be made of compounds or alloys including a composition of metal material, such as aluminum and silver.

Furthermore, in the present embodiment, the touch display device further includes a color filter layer C1. The color filter layer C1 is placed on the upper substrate 10, so that light reflected by the reflection layer 22 will pass through the color filter layer C1 to the liquid crystal layer 30. The color filter layer C1 includes various color resistors, such as red color resistors, green color resistors, and blue color resistors. Each color resistor corresponds to one pixel unit on the array substrate, so that light emitted from each pixel unit displays a corresponding color. Adjacent color resistors are spaced from each other by a black matrix to prevent color mixing.

In the touch display device provided by the present embodiment, for each pixel unit, under driven by the voltage difference between the pixel electrode and the common electrode, liquid crystal molecules of the liquid crystal layer change their state, such as being rotated and twisted, which is cooperated with a polarized device placed on the upper base substrate, so that each pixel unit has an off-state and an on-state according to time division. When the pixel unit is in the off-state, light reflected by the reflection layer cannot pass through the pixel unit, and at this time the pixel unit displays black color; and when pixel unit is in the on-state, light reflected by the reflection layer can pass through the pixel unit, and at this time the pixel unit displays color of the color resistor corresponding to the pixel unit. By controlling the data signals provided by the data lines electrically connected with each pixel unit, each pixel unit displays colors required by different images, and then the touch display device can display colorful images using external ambient light (such as sun light) without additional backlight, thereby saving power consumption.

Furthermore, in the touch display device provided by the present embodiment, the array substrate with the touch detection structure is placed on a side of the liquid crystal layer facing the users, and the common electrode and the reflection layer are placed on a side of the liquid crystal layer away from the users. That is to say, no whole or large area display electrode such as the common electrode is placed between the touch detection structure and the users. Thus, external touch signals provided by the users will not be shielded by the whole or large area display electrode such as the common electrode, and the touch function can be better realized.

Figure 5:
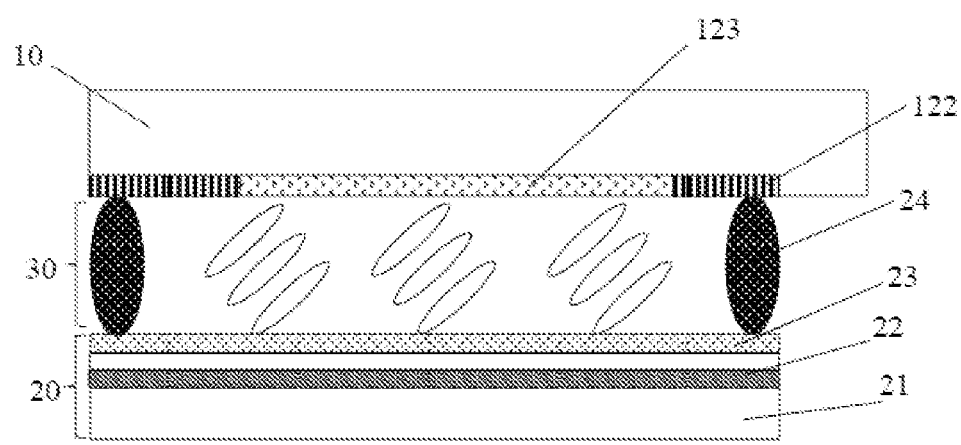
FIG. 5 illustrates a cross-sectional view of a touch display device according to still another embodiment of the present disclosure.

FIG. 5 is a cross-sectional view of a touch display device in another embodiment of the present disclosure. The touch display device in the present embodiment is a reflective-type touch display device, and includes an upper substrate 10, a lower substrate 20 placed opposite to the lower substrate 10, and a liquid crystal layer 30 placed between the upper substrate 10 and the lower substrate 20. The upper substrate 10 is placed between users (or users' eyes) and the lower substrate 20.

In the present embodiment, the upper substrate 10 is an array substrate, and has a similar structure to the upper substrate in FIGS. 1 and 2. The upper substrate 10 includes a touch detection structure and a plurality of pixel units arranged in a matrix. Each pixel unit includes a switch element, a pixel electrode, a storage electrode 123, a data line, a scan line, and so on. In each pixel unit, the storage electrode 123 and the pixel electrode are overlapped, to provide a storage voltage for each pixel unit. The lower substrate 20 includes a lower base substrate 21, a reflection layer 22, and a common electrode 23. The reflection layer 22 and the common electrode 23 are placed on the lower base substrate 21. The reflection layer 22 is used for reflecting external light, and the external light refers to external ambient light, which is light from the exterior of the touch display device, sequentially emitting to the upper substrate and the liquid crystal layer, and then being incident to the reflection layer 22. The reflection layer 22 can be made of aluminum or silver by an evaporation method, or can be made of compounds or alloys including a composition of metal material, such as aluminum and silver.

In the present embodiment, the upper substrate 10 and the lower substrate 20 are sealed to be a box by a sealing adhesive 24 surrounding the periphery of the upper substrate 10, and the liquid crystal layer 30 is sealed in the box. A plurality of conductive particles is placed in the sealing adhesive 24. The conductive particles can be spherical elastic resin particles plated with metal (such as gold and silver) plated on their outer surface to realize conduction. The conductive particles in the sealing adhesive 24 are spaced from each other, so that the conductive particles can only electrically connect the upper substrate with the lower substrate, but cannot perform a transverse conduction. The upper substrate 10 further includes a common electrode connection line 122. The common electrode 23 on the lower substrate 20 is electrically connected with the common electrode connection line 122 by the conductive particles in the sealing adhesive 24, and is electrically connected with a drive integrated circuit on the upper substrate 10 by the common electrode connection line 122, so that a common voltage signal provided by the drive integrated circuit is supplied to the common electrode 23.

Furthermore, in the present embodiment, the storage electrode 123 is also electrically connected with the common electrode connection line 122, so that when providing a common voltage to the common electrode 23, a same common voltage is provided to the storage electrode 123 at the same time.

In the touch display device provided by the present embodiment, the array substrate with the touch detection structure is placed on a side of the liquid crystal layer facing the users, and the common electrode and the reflection layer are placed on a side of the liquid crystal layer away from the users. That is to say, no whole or large area display electrode such as the common electrode, is placed between the touch detection structure and the users. Thus, external touch signals provided by the users will not be shielded by the whole or large area display electrode such as the common electrode, and the touch function can be better realized.

Figure 6:
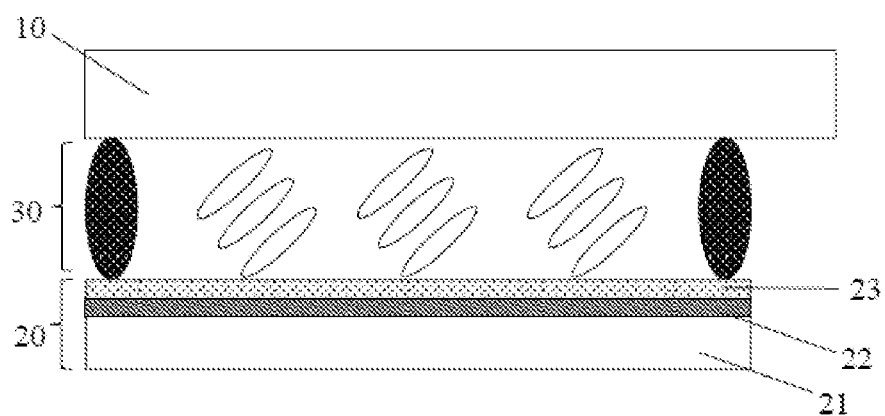
FIG. 6 illustrates a cross-sectional view of a touch display device according to still another embodiment of the present disclosure.

FIG. 6 is a cross-sectional view of a touch display device in another embodiment of the present disclosure. The touch display device in the present embodiment is a reflective-type touch display device, and includes an upper substrate 10, a lower substrate 20 placed opposite to the lower substrate 10, and a liquid crystal layer 30 placed between the upper substrate 10 and the lower substrate 20. The upper substrate 10 is placed between users (or users' eyes) and the lower substrate 20.

In the present embodiment, the upper substrate 10 is an array substrate, and has a similar structure to the upper substrate in FIGS. 1 and 2. The upper substrate 10 includes a touch detection structure and a plurality of pixel units arranged in a matrix. Each pixel unit includes a switch element, a pixel electrode, a storage electrode, a data line, a scan line, and so on. The lower substrate 20 includes a lower base substrate 21, a reflection layer 22, and a common electrode 23. The reflection layer 22 and the common electrode 23 are placed on the lower base substrate 21. The reflection layer 22 is used for reflecting external light, and the external light refers to external ambient light, which light is from the exterior of the touch display device, sequentially emitting to the upper substrate and the liquid crystal layer, and then incident to the reflection layer 22. The reflection layer 22 can be made of aluminum or silver by an evaporation method, or can be made of compounds or alloys including a composition of metal material, such as aluminum and silver.

In the present embodiment, the common electrode 23 directly contacts with the reflection layer 22. The direct contact can be: after forming the reflection layer 22 by evaporating aluminum, silver, or compounds including a composition of aluminum, silver, or both of them or alloys including a composition of aluminum, silver, or both of them, on the lower base substrate 21, then forming the common electrode 23 on a side of the reflection layer 22 away from the lower base substrate, without any film layer of inorganic insulation materials or organic insulation materials; or, the common electrode 23 is electrically connected with the reflection layer 22 by a connection line or through a through hole. Compared to a single-layer common electrode, a structure that the common electrode 23 directly contacts with the reflection layer 22 can reduce resistance of the common electrode, and improve drive uniformity of the touch display device.

In the present embodiment, the upper substrate 10 and the lower substrate 20 are sealed to be a box by a sealing adhesive surrounding the periphery of the upper substrate 10, and the liquid crystal layer 30 is sealed in the box. The common electrode 23 on the lower substrate 20 is electrically connected with a common electrode connection line by the conductive particles in the sealing adhesive, and is electrically connected with a drive integrated circuit on the upper substrate by the common electrode connection line 122, so that a common voltage signal provided by the drive integrated circuit is supplied to the common electrode 23.

Figure 7:
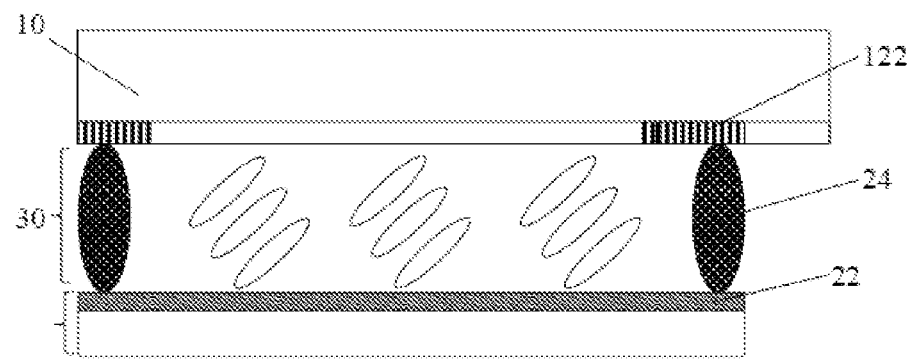
FIG. 7 illustrates a cross-sectional view of a touch display device according to still another embodiment of the present disclosure.

FIG. 7 is a cross-sectional view of a touch display device in another embodiment of the present disclosure. The touch display device in the present embodiment is a reflective-type touch display device, and includes an upper substrate 10, a lower substrate 20 placed opposite to the lower substrate 10, and a liquid crystal layer 30 placed between the upper substrate 10 and the lower substrate 20. The upper substrate 10 is placed between users (or users' eyes) and the lower substrate 20.

In the present embodiment, the upper substrate 10 is an array substrate, and has a similar structure to the upper substrate in FIGS. 1 and 2. The upper substrate 10 includes a touch detection structure and a plurality of pixel units arranged in a matrix. Each pixel unit includes a switch element, a pixel electrode, a storage electrode, a data line, a scan line, and so on. The lower substrate 20 includes a lower base substrate 21 and a reflection layer 22 placed on the lower base substrate 21. The reflection layer 22 is used for reflecting external light, and the external light refers to external ambient light, which light is from the exterior of the touch display device, sequentially emitting to the upper substrate and the liquid crystal layer, and then incident to the reflection layer 22.

In the present embodiment, the reflection layer 22 is multiplexed as a common electrode. The upper substrate 10 and the lower substrate 20 are sealed to be a box by a sealing adhesive surrounding the periphery of the upper substrate 10, and the liquid crystal layer 30 is sealed in the box. The reflection layer 22 on the lower substrate 20 is electrically connected with the common electrode connection line 122 by the conductive particles in the sealing adhesive, and is electrically connected with a drive integrated circuit on the upper substrate by the common electrode connection line 122, so that a common voltage signal provided by the drive integrated circuit is provided to the reflection layer 22. The reflection layer has the functions of reflecting light and of providing the common voltage to the liquid crystal layer at the same time, so that an additional common electrode layer is not needed, which reduces process steps of the touch display device and saves cost. In addition, light reflected by the reflection layer is not required to pass through the additional common electrode layer, which increases transmittance of the touch display device and improves the brightness.

In the touch display device provided by the present embodiment, the array substrate with the touch detection structure is placed on a side of the liquid crystal layer facing the users, and the reflection layer multiplexed as a common electrode is placed on a side of the liquid crystal layer away from the users. That is to say, no whole or large area display electrode such as the common electrode is placed between the touch detection structure and the users. Thus, external touch signals provided by the users will not be shielded by the whole or large area display electrode such as the common electrode, and the touch function can be better realized.

Figure 8:
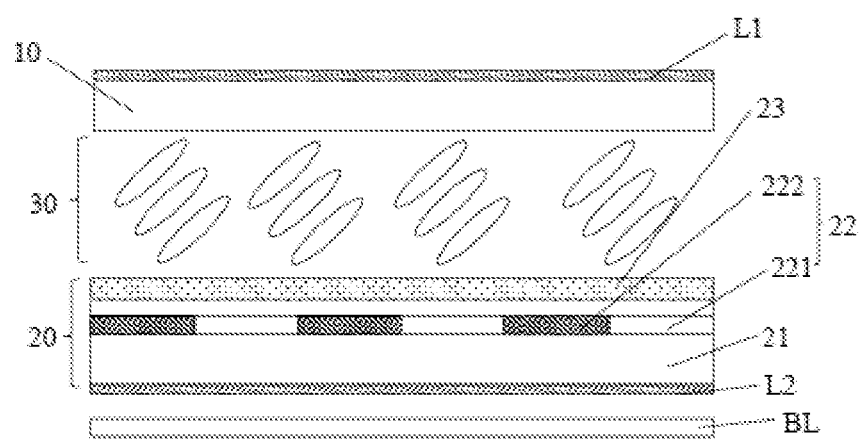
FIG. 8 illustrates a cross-sectional view of a touch display device according to still another embodiment of the present disclosure.
Figure 9:
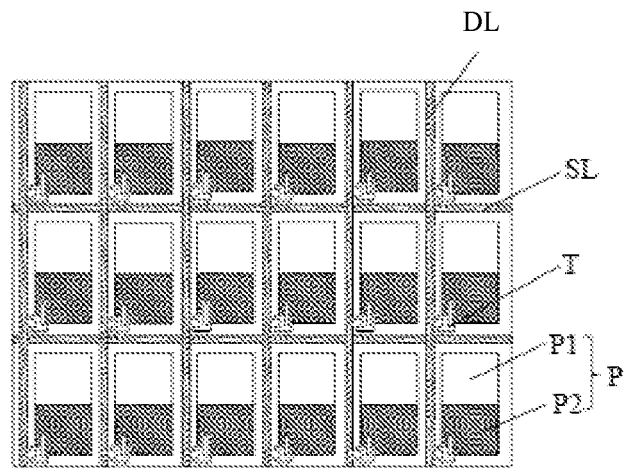
FIG. 9 illustrates a structural schematic view of a pixel of the touch display device as shown in FIG. 8.

Furthermore, an embodiment of the present disclosure provides a transflective touch display device, as shown in FIGS. 8 and 9. FIG. 8 is a cross-sectional view of a touch display device in another embodiment of the present disclosure, and FIG. 9 is a structural schematic view of a pixel of the touch display device as shown in FIG. 8. The transflective touch display device in the present embodiment includes a polarizer L1, an upper substrate 10, a lower substrate 20 placed opposite to the lower substrate 10, a liquid crystal layer 30 placed between the upper substrate 10 and the lower substrate 20, and a lower polarizer L2. The upper substrate 10 is placed between users (or users' eyes) and the lower substrate 20.

In the present embodiment, the touch display device further includes a backlight module BL placed on a side of the lower substrate 20 away from the upper substrate 10. The backlight module BL cooperated with external ambient light provides light to display images. The upper polarizer L1 is placed on a side of the upper substrate 10 away from the backlight module BL, and the lower polarizer L2 is placed between the lower substrate 20 and the backlight module BL.

In the present embodiment, the upper substrate 10 is an array substrate, and has a similar structure to the upper substrate in FIGS. 1 and 2. The upper substrate 10 includes a touch detection structure and a plurality of pixel units arranged in a matrix. As shown in FIG. 9, the upper substrate 10 includes a plurality of data lines DL arranged along a row direction and extending along a column direction, and a plurality of scan lines SL arranged along the column direction and extending along the row direction. The data lines and the scan lines intersect to define a plurality of pixel units P. Each pixel unit P includes a switch element T and a pixel electrode. Each switch element T includes a source electrode, a drain electrode, and a semiconductor channel. The data line DL is electrically connected with the source electrode of the switch element T. The pixel electrode is electrically connected with the drain electrode of the switch element T.

The lower substrate 20 includes a lower base substrate 21 and a reflection layer 22 placed on the lower base substrate 21. The reflection layer 22 includes an open area 221 and a reflection area 222. Each pixel unit P includes a first area P1 corresponding to the open area 221 and a second area P2 corresponding to the reflection area 222. The reflection area 222 is made of aluminum, silver, compounds including composition of aluminum or silver, or their alloys, and is used for reflecting external light, and the external light refers to external ambient light, which light is from the exterior of the touch display device, sequentially emitting to the upper substrate and the liquid crystal layer, and then incident to the reflection layer 22. The open area 221 is used for transmitting light incident from the backlight module BL, so that light sequentially passes through the lower polarizer L2, the lower substrate 20, the upper substrate 10, and the upper polarizer L1 under control of the liquid crystal layer, so that the touch display device displays images.

In addition, the touch display device further includes a common electrode 23. The common electrode 23 is used for providing a common voltage to the touch display device, and liquid crystal molecules of the liquid crystal layer change their state under a voltage difference between the pixel electrode and the common electrode, so that the polarization direction of light passing through the liquid crystal layer is changed. Apparently, the reflection layer can be multiplexed as a common electrode, so that an additional common electrode is not needed, which reduces the making process steps and saves cost.

In the touch display device provided by the present embodiment, the array substrate with the touch detection structure is placed on a side of the liquid crystal layer facing the users, and the reflection layer and the common electrode are placed on a side of the liquid crystal layer away from the users. That is to say, no whole or large area display electrode such as the common electrode is placed between the touch detection structure and the users. Thus, external touch signals provided by the users will not be shielded by the whole or large area display electrode such as the common electrode, and the touch function can be better realized.

In addition, since the touch display device of the present embodiment has the reflection area, in an environment of strong externa ambient light (such as sunlight), the display brightness of the touch display device can be improved by sufficiently utilizing external ambient light reflected by the reflection area, which solves the disadvantage of low display brightness in the environment of strong externa ambient light for a transmissive-type liquid crystal display device. Or, in the environment of strong externa ambient light (such as sunlight), the backlight module can be turned off, images are displayed only by reflecting the external light, for effectively decreasing power consumption. Compared to a reflective-type display device, the touch display device of the present embodiment includes the backlight module, and the reflective layer includes the open area through which light emitted from the backlight module can pass, so that in an environment of poor external ambient light, especially in a dark environment, images can still be displayed by turning on the backlight module. That is to say, in environments with ambient light of different intensity, such as indoor and outdoor environments, the touch display device of the present disclosure can display images with enough brightness, so as to save power consumption.

Figure 10:
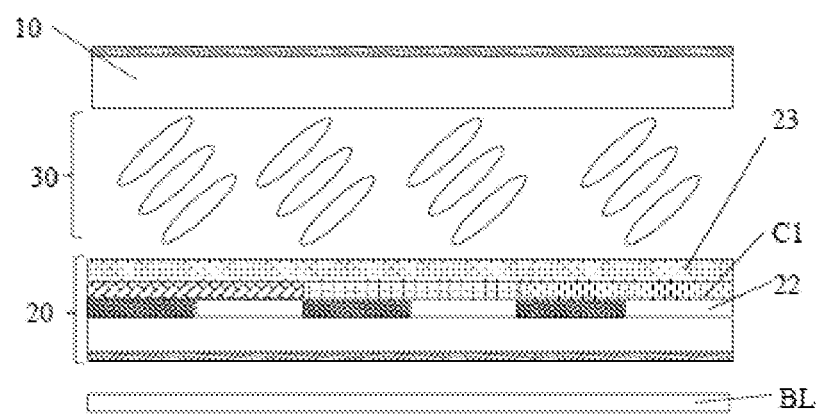
FIG. 10 illustrates a cross-sectional view of a touch display device according to still another embodiment of the present disclosure.

FIG. 10 is a cross-sectional view of a touch display device in another embodiment of the present disclosure. Similar to the touch display device as shown in FIG. 8, the transflective touch display device in the present embodiment includes an upper polarizer L1, an upper substrate 10, a lower substrate 20 placed opposite to the lower substrate 10, a liquid crystal layer 30 placed between the upper substrate 10 and the lower substrate 20, a lower polarizer L2, and a backlight module BL. The upper substrate 10 is placed between users (or users' eyes) and the lower substrate 20. The lower substrate 20 is placed between the upper substrate 10 and the backlight module BL. The upper substrate 10 is an array substrate, and includes a touch detection structure and a plurality of pixel units arranged in a matrix.

In the present embodiment, the lower substrate 20 includes a reflection layer 22 and a color filter layer C1. The reflection layer 22 includes an open area and a reflection area. The reflection area 222 is made of aluminum, silver, compounds including composition of aluminum or silver, or their alloys, and is used for reflecting external light, and the external light refers to external ambient light, which light is from the exterior of the touch display device, emitting to the upper substrate and the liquid crystal layer, and then incident to the reflection layer 22. The open area is used for transmitting light incident from the backlight module BL, so that light sequentially passes through the color filter layer C1, the lower polarizer, the lower substrate, the upper substrate, and the upper polarizer under control of the liquid crystal layer, so that the touch display device displays images. The color filter layer C1 is placed on a side of the reflection layer 22 facing the liquid crystal layer 30, so that light reflected by the reflection area and/or transmitted from the open area can pass through the color filter layer C1 to the liquid crystal layer 30. The color filter layer C1 includes various color resistors, such as red color resistor, green color resistor, and blue color resistor. Each color resistor corresponds to one pixel unit on the array substrate, so that light emitted from each pixel unit displays a corresponding color. Adjacent color resistors are spaced from each other by a black matrix to prevent color mixing. Or, the black matrix placed on the array substrate covers a joining area between the adjacent color resistors to prevent color mixing. Apparently, in other embodiments, the color filter layer can be placed on the upper substrate.

Furthermore, the touch display device further includes a common electrode 23. The common electrode 23 is used for providing a common voltage to the touch display device, and liquid crystal molecules of the liquid crystal layer change their states under a voltage difference between the pixel electrode and the common electrode, thereby allowing or preventing the transmission of light. Apparently, the reflection layer can be multiplexed as a common electrode, so that an additional common electrode is not needed.

In the touch display device provided by the present embodiment, the array substrate with the touch detection structure is placed on a side of the liquid crystal layer facing the users, and the reflection layer and the common electrode are placed on a side of the liquid crystal layer away from the users. That is to say, no whole or large area display electrode such as the common electrode is placed between the touch detection structure and the users. Thus, external touch signals provided by the users will not be shielded by the whole or large area display electrode such as the common electrode, and the touch function can be better realized.

Additionally, in environments with ambient light of different intensity, such as indoor and outdoor environments, the touch display device of the present embodiment can display images with enough brightness and save power consumption.

It is noted that, the above are only preferred embodiments of the present disclosure and the technical principles used. Those skilled in the art shall understand, the present disclosure is not limited to the specific embodiments described. They can make various modifications, re-adjustments and replacements without departing from the protection scope of the present disclosure. Therefore, although the present disclosure has been described in detail with the above embodiments, the present disclosure is not limited to the above embodiments, other equivalent embodiments can be included without departing from the inventive concept of the present disclosure. The scope of the present disclosure shall be defined by the appended claims.

What is claimed is:

1. A touch display device, comprising:
   an upper substrate, comprising an upper base substrate, a touch detection structure and a plurality of pixel units arranged in a matrix, each of the plurality of pixel units comprising a switch element and a pixel electrode;
   a lower substrate, comprising a common electrode and a reflection layer, the reflection layer being used for reflecting external light; and
   a liquid crystal layer, placed between the upper substrate and the lower substrate,
   wherein the upper substrate is arranged above the lower substrate, and the lower substrate is arranged below the liquid crystal layer;
   wherein the external light is from an exterior of the touch display device and sequentially emitting to the upper substrate and the liquid crystal layer and then being incident to the reflection layer;
   wherein the touch detection structure is arranged between the upper base substrate and the plurality of pixel units, the plurality of pixel units is arranged between the touch detection structure and the liquid crystal layer, and the liquid crystal layer is arranged between the plurality of pixel units and the reflection layer;
   wherein an orthographic projection of the common electrode onto the upper substrate covers an entirety of an orthographic projection of each of the plurality of pixel units onto the upper substrate; and
   wherein the upper substrate further comprises a black matrix located between the switch element and the upper base substrate.

2. The touch display device according to claim 1, wherein the reflection layer is multiplexed as the common electrode.

3. The touch display device according to claim 1, wherein the touch detection structure comprises a touch electrode, and the touch electrode is time-division multiplexed as a storage electrode.

4. The touch display device according to claim 1, wherein the common electrode is a transparent conduction electrode, and the common electrode is placed between the liquid crystal layer and the reflection layer.

5. The touch display device according to claim 1, wherein the reflection layer is placed between the liquid crystal layer and the common electrode.

6. The touch display device according to claim 1, wherein the common electrode is electrically connected with the reflection layer.

7. The touch display device according to claim 1, wherein the lower substrate further comprises a color filter layer, and the color filter layer is placed between the liquid crystal layer and the reflection layer.

8. The touch display device according to claim 1, wherein the upper substrate further comprises an upper base substrate and a color filter layer, and the color filter layer is placed on a side of the upper base substrate facing the liquid crystal layer.

9. The touch display device according to claim 1, wherein the upper substrate further comprises a metallic wiring, and
   wherein a projection of the metallic wiring on the upper substrate is located in a projection of the black matrix on the upper substrate.

10. The touch display device according to claim 1, further comprising a backlight module, wherein the lower substrate is placed between the backlight module and the upper substrate; and wherein the reflection layer comprises a reflection area and an open area.

11. The touch display device according to claim 10, wherein each of the plurality of pixel units comprises a first area and a second area, the first area corresponds to the reflection area, and the second area corresponds to the open area.

12. The touch display device according to claim 10, wherein the lower substrate further comprises a color filter layer, and the color filter layer is placed between the liquid crystal layer and the reflection layer.

13. The touch display device according to claim 10, wherein the upper substrate further comprises a color filter layer, and the color filter layer is placed on a side of the upper base substrate facing the liquid crystal layer.

14. The touch display device according to claim 1, wherein the lower substrate further comprises a lower base substrate, and the reflection layer is placed on a side of the lower base substrate facing the liquid crystal layer.

15. The touch display device according to claim 14, wherein the reflection layer is made of metallic material.

16. The touch display device according to claim 15, wherein the reflection layer is made of silver or aluminum.

* * * * *